Aug. 17, 1943.    J. B. MEEK    2,326,873
DEVICE FOR REMOVING CORN FROM EARS
Filed Sept. 15, 1942
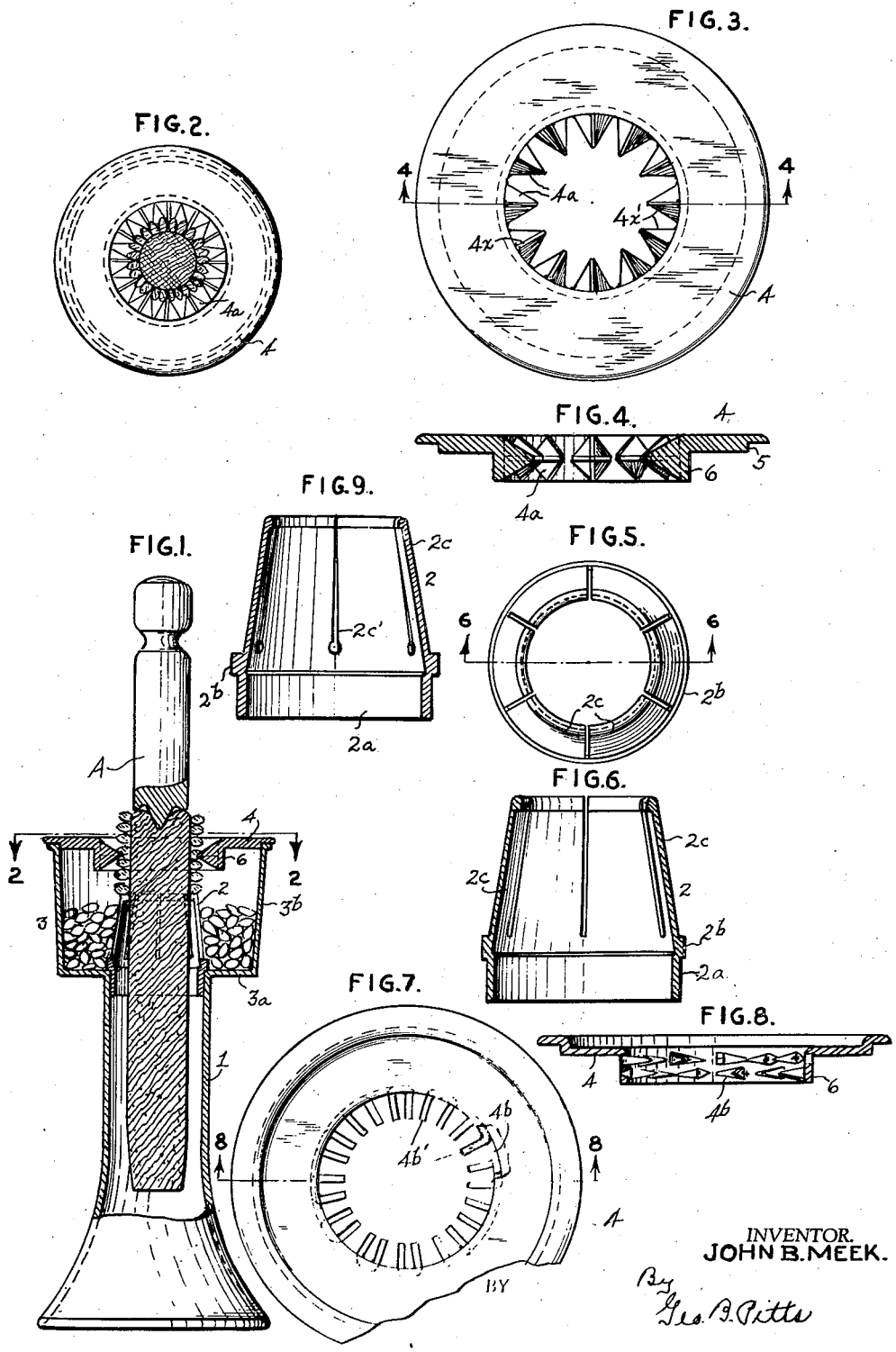
INVENTOR.
JOHN B. MEEK.

Patented Aug. 17, 1943

2,326,873

UNITED STATES PATENT OFFICE 2,326,873

DEVICE FOR REMOVING CORN FROM EARS

John B. Meek, Cleveland, Ohio

Application September 15, 1942, Serial No. 458,434

4 Claims. (Cl. 146—4)

This invention relates to a device for removing kernels from corn ears either in a green or cooked state.

One object of the invention is to provide a device of this character arranged to remove kernels from ears of corn in a ready manner and comprising few parts which may be readily cleaned.

Another object of the invention is to provide an improved portable device of this character adapted to operate in a ready manner on corn ears of different sizes.

A further object of the invention is to provide an improved device of this character of simple construction and arranged to first cut or mutilate the corn kernels and to then scrape the kernels from the ear and collect the kernels ready for use.

A further object of the invention is to provide an improved device of this character wherein corn ears may be manually subjected to a series of cutters and a series of scrapers in a ready and easy manner to efficiently remove the kernels therefrom.

Other objects of the invention will be apparent to those skilled in the art to which my invention relates from the following description taken in connection with the accompanying drawing, wherein Fig. 1 is a view, partly in section, of a device embodying my invention.

Fig. 2 is a section on the line 2—2 of Fig. 1.

Fig. 3 is a plan view, enlarged.

Fig. 4 is a section on the line 4—4 of Fig. 3.

Fig. 5 is a plan view of the scraper.

Fig. 6 is a section on the line 6—6 of Fig. 5.

Fig. 7 is a view showing a modification, parts being broken away.

Fig. 8 is a section on the line 8—8 of Fig. 7.

Fig. 9 is a sectional view showing a modification.

In the drawing, 1 indicates a support of any desired shape arranged to rest on a table or other supporting member. The support 1 is preferably hollow so as to form a receiver for the corn cobs, as later set forth, its lower portion being flared outwardly to form a wide or enlarged base portion. The lower end of the support 1 is open so that each cob may be removed therefrom, but it will be obvious that the side wall of the support 1 may be formed with an opening to permit removal of the cob therethrough from the support; in this latter arrangement the bottom of the support 1 is preferably closed by an end wall.

The upper end of the support 1 forms a seat for a removable scraper, indicated as an entirety at 2, through which the ears are passed or moved endwise to effect removal of the corn kernels, the cob being pushed downwardly into the support 1. The scraper 2 comprises a collar 2a removably fitting into the support 1, a ring 2b surrounding the collar 2a to form an annular shoulder to engage the upper end wall of the support 1, and up-standing scraping elements 2c disposed in annular relation. While the collar 2a, ring 2b and scraping elements 2c are (by preference) integral, the latter are formed of relatively thin material to insure a limited resiliency thereof, whereby these elements may yield radially outwardly to accommodate different sized cobs. As shown, the scraping elements are arc shape in cross section and taper inwardly toward their upper ends, which are in substantial contact so as to engage the cob throughout its circumference. The scraping elements 2c are provided by cutting the wall of the scraper 2 from its upper free edge to a point adjacent the ring 2b to insure adequate resiliency and permit the scraping elements to accommodate corn ears varying greatly in size as well as provide for the removal of husks of kernels which may lodge between the cutting elements. The side edges of adjoining scraping elements may have a slight diverging relation from their outer ends downwardly, substantially at an angle of approximately two degrees, as shown at 2c' in Fig. 9, to facilitate removal of any husks of the kernels caught or lodging therein as well as to insure easy cleaning of the scraper from time to time, and to prevent any substantital portion of the kernels from passing into the support 1 and becoming wasted. The scraping elements 2c terminate in rounded or blunt ends to eliminate sharp edges which would cut or dig into the cob and thus cut off impalatable material. Where the scraping elements are formed of metal, their walls are approximately .04 thick to insure resiliency and the metal of each element is bent inwardly and back on itself to provide a rounded scraping edge.

3 indicates an annular collecting chamber surrounding the scraper 2 and arranged to collect the kernels and juice removed from the cob. The chamber 3 consists of an annular bottom wall 3a surrounding and suitably secured to the upper end of the support 1 and a side wall 3b which extends to a point above the scraper 2.

4 indicates an annular plate removably seated on the upper end of the side wall 3b and provided on its inner circumferential edge with a plurality of cutters 4a extending radially inwardly and serving to cut, split or mutilate the corn kernels as each ear is projected endwise downwardly to and through the scraper 2. The outer circumferential edge of the plate 4, on its lower side, is rabbeted, as shown at 5 to form a seat to engage the side wall 3b, whereas its inner circumferential edge is provided with a depending flange 6, on which the cutters 4a are mounted. The cutters 4a may be of any desired shape. Where the plate, flange and cutters are cast, each cutter may be provided with an inclined edge 4x and diverging side walls 4x', as shown in Fig. 3. Where the plate and flange are formed of a sheet metal stamping, the flange may be cut on V-shaped lines 4b and the metal between the lines bent inwardly as shown at 4b'. In this latter arrangement, the cuts are preferably off-set and oppositely disposed to provide the maximum number of cutters.

It will be understood that one or more parts of the device may be formed from a plastic material or sheet metal, as desired.

In operation each ear of corn is projected endwise through the cutters and into and through the scraper. As the cutters are disposed in a plane above the scraping elements, the corn kernels are first cut or split lengthwise of the ear or otherwise mutilated and then scraped from the cob as the ear is moved endwise and projected into the support 1. To avoid danger of the person's hand engaging the cutters, a follower A may be applied to the outer or rear end of the ear and thus insure its movement entirely through the scraper.

It will be observed that the support 1 and chamber 3 are fixedly related, whereas the scraper 2 and plate 4, which carry the cutters, are removable, so that all of the parts may be readily cleaned.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. In a portable device for removing kernels from corn ears, the combination of an upright member, the upper portion of which is hollow to form a receiver for the cobs, a substantially annular scraper through which ears of corn are projected endwise into said receiver to remove the kernels therefrom, said scraper being mounted on the upper end of and in alinement with said receiver, an annular chamber mounted on said receiver and surrounding said scraper, an annular plate mounted on the side walls of said chamber to form a cover therefor, and a series of cutters mounted on the inner wall of said plate and extending inwardly therefrom into the path of the corn ears to cut the kernels on each ear as it moves to said scraper.

2. In a portable device for removing kernels from corn ears, the combination of an upright member, the upper portion of which is hollow to form a receiver for the cobs, a substantially annular scraper through which ears of corn are projected endwise into said receiver to remove the kernels therefrom, said scraper being mounted on the upper end of and in alinement with said receiver, an annular chamber mounted on said receiver and surrounding said scraper, the side walls of said chamber terminating in a plane above said scraper, an annular plate mounted on the side walls of said chamber to form a cover therefor, the inner circumferential edge of said plate being formed with a depending flange, and a series of cutters mounted on said flange and extending inwardly therefrom into the path of the corn ears to cut the kernels from each ear as it moves to said scraper.

3. A device as claimed in claim 2 wherein the scraper consists of a collar mounted on the upper end of said receiver and provided with a plurality of resilient members in side by side relation and terminating at their free ends in arc shaped scraping edges.

4. In a portable device for removing kernels from corn ears, the combination of an upright member, the upper portion of which is hollow to form a receiver from the cobs, a substantially annular scraper through which ears of corn are projected endwise into said receiver to remove the kernels therefrom, said scraper being removably mounted on the upper end of and in alinement with said receiver, an annular chamber mounted on said receiver and surrounding said scraper, an annular plate removably mounted on the side walls of said chamber to form a cover therefor, and a series of cutters mounted on the inner wall of said plate and extending inwardly therefrom into the path of the corn ears to cut the kernels on each ear as it moves to said scraper.

JOHN B. MEEK.